Sept. 22, 1970           B. L. BUDZYN           3,529,481
CHAIN DRIVE SYSTEM FOR MOBILE LOADING PLATFORM
OR FOR TWO- OR THREE-DIMENSIONAL INDEXING
Filed March 27, 1968           4 Sheets-Sheet 3
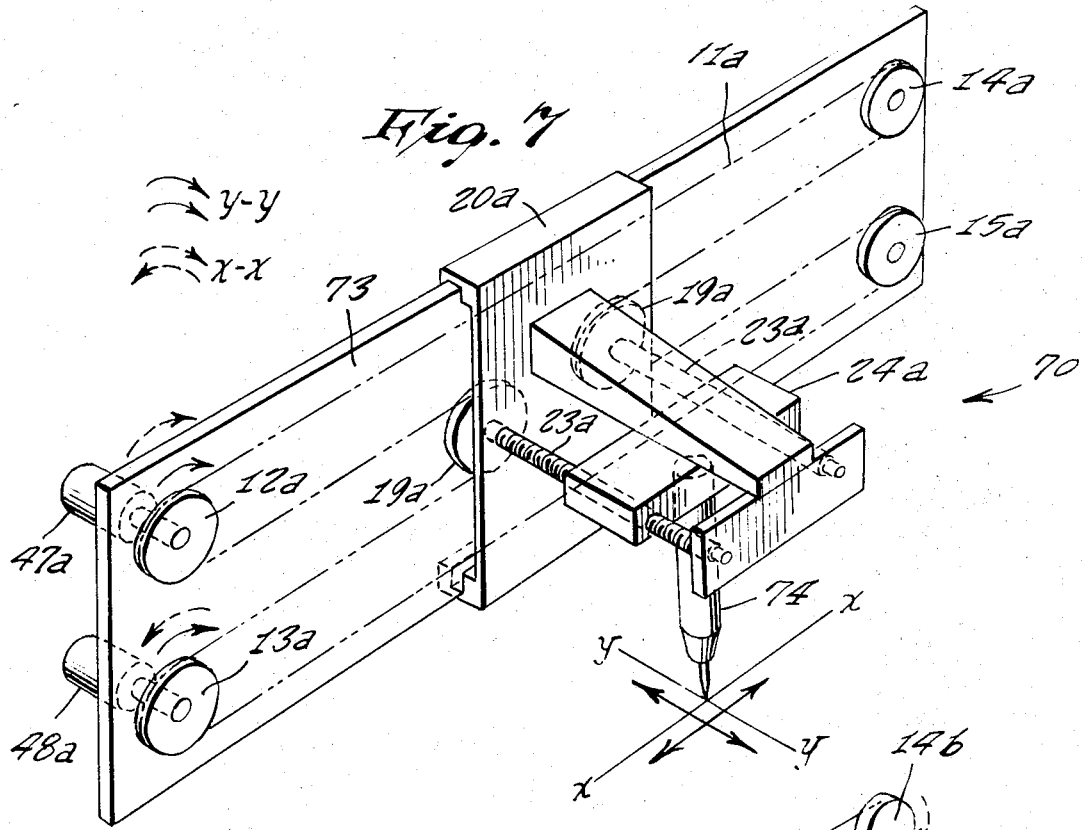
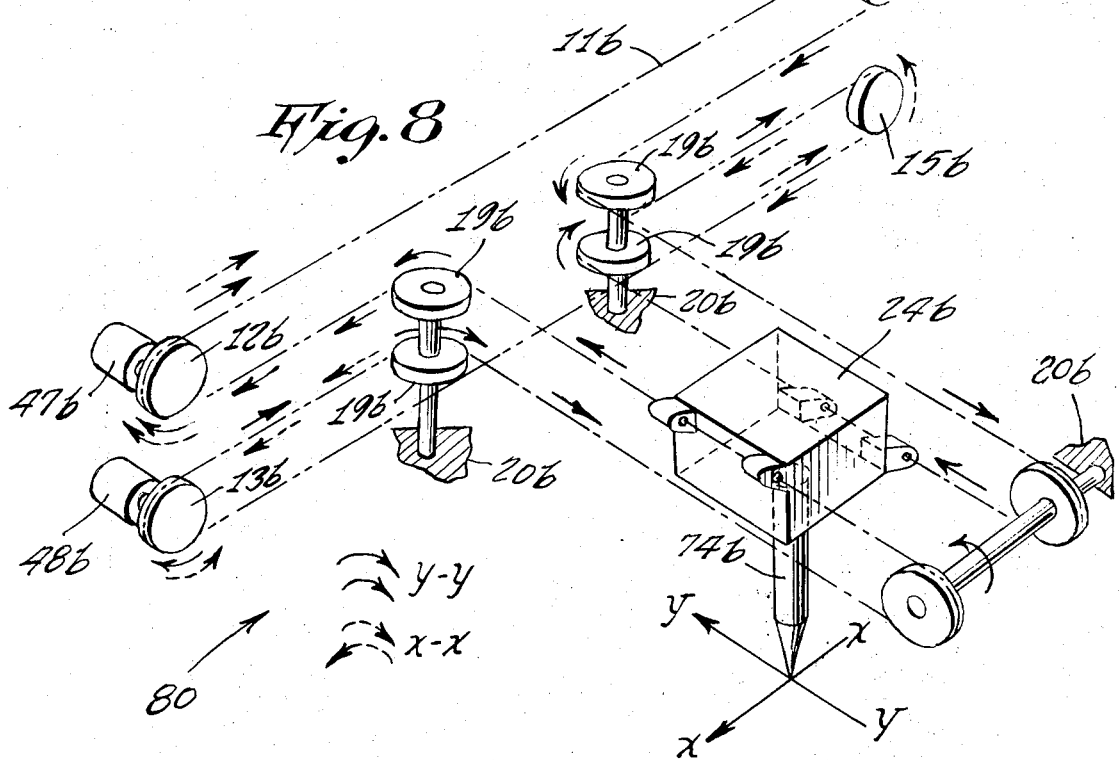
INVENTOR
BOLESLAW L. BUDZYN

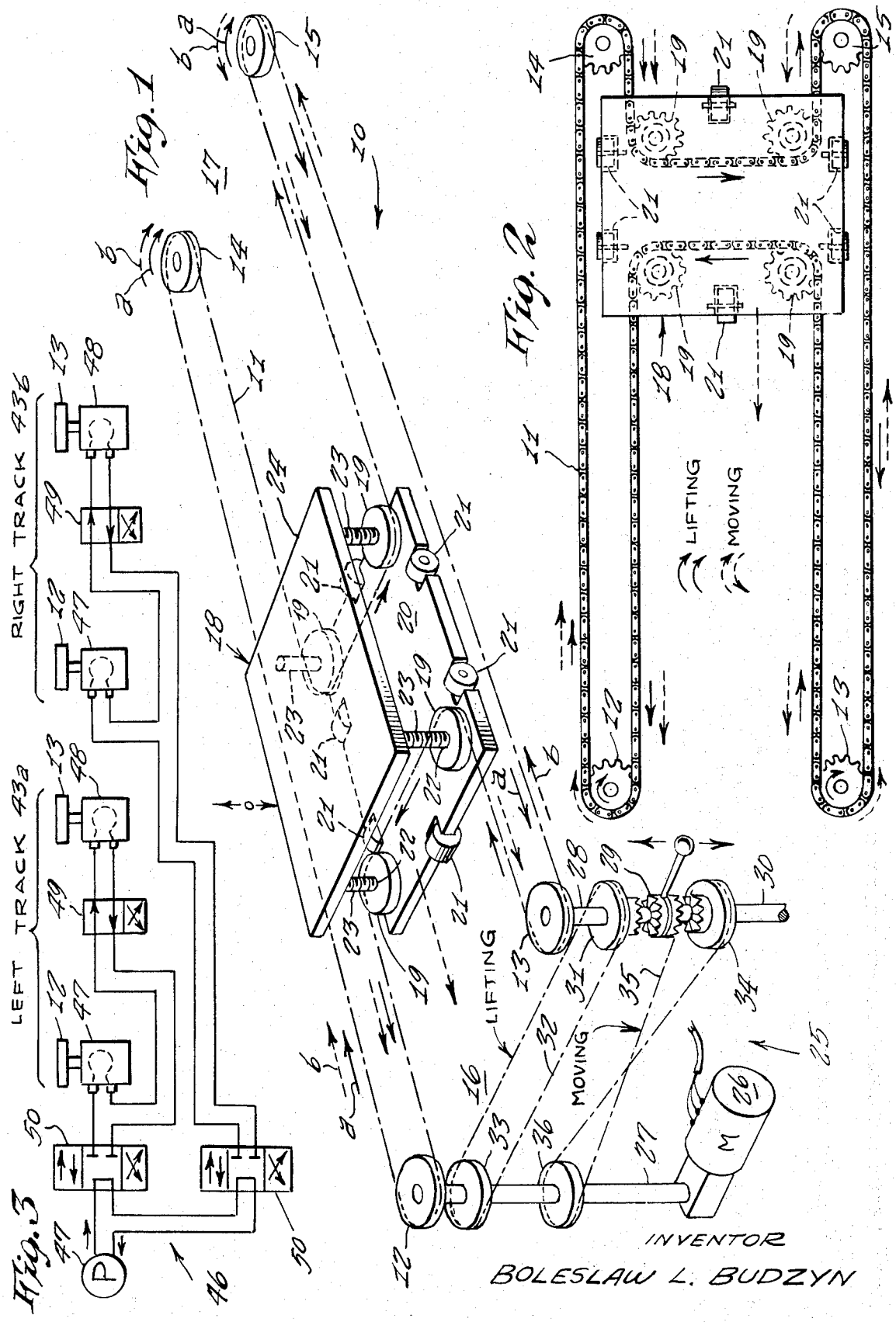

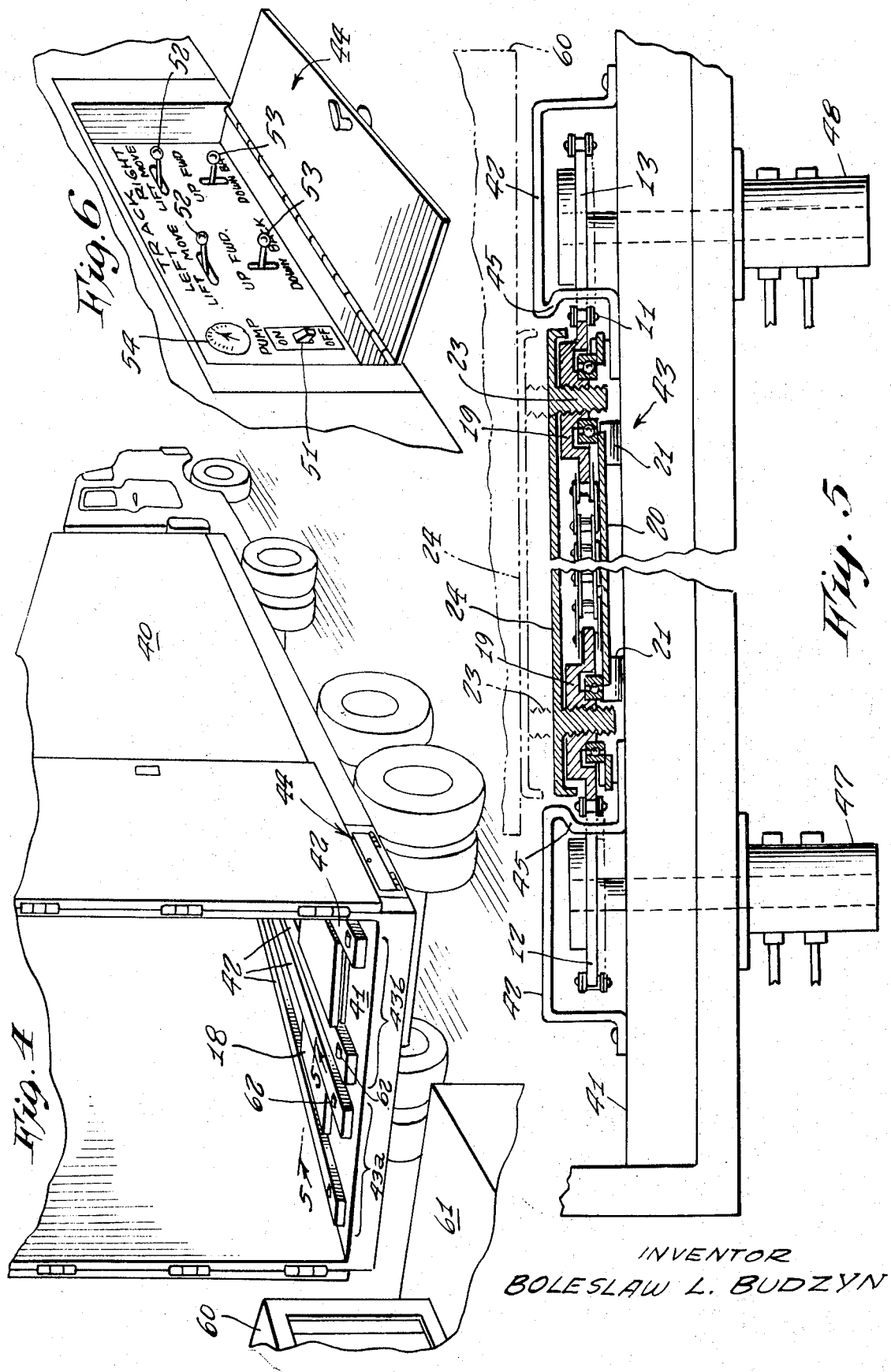

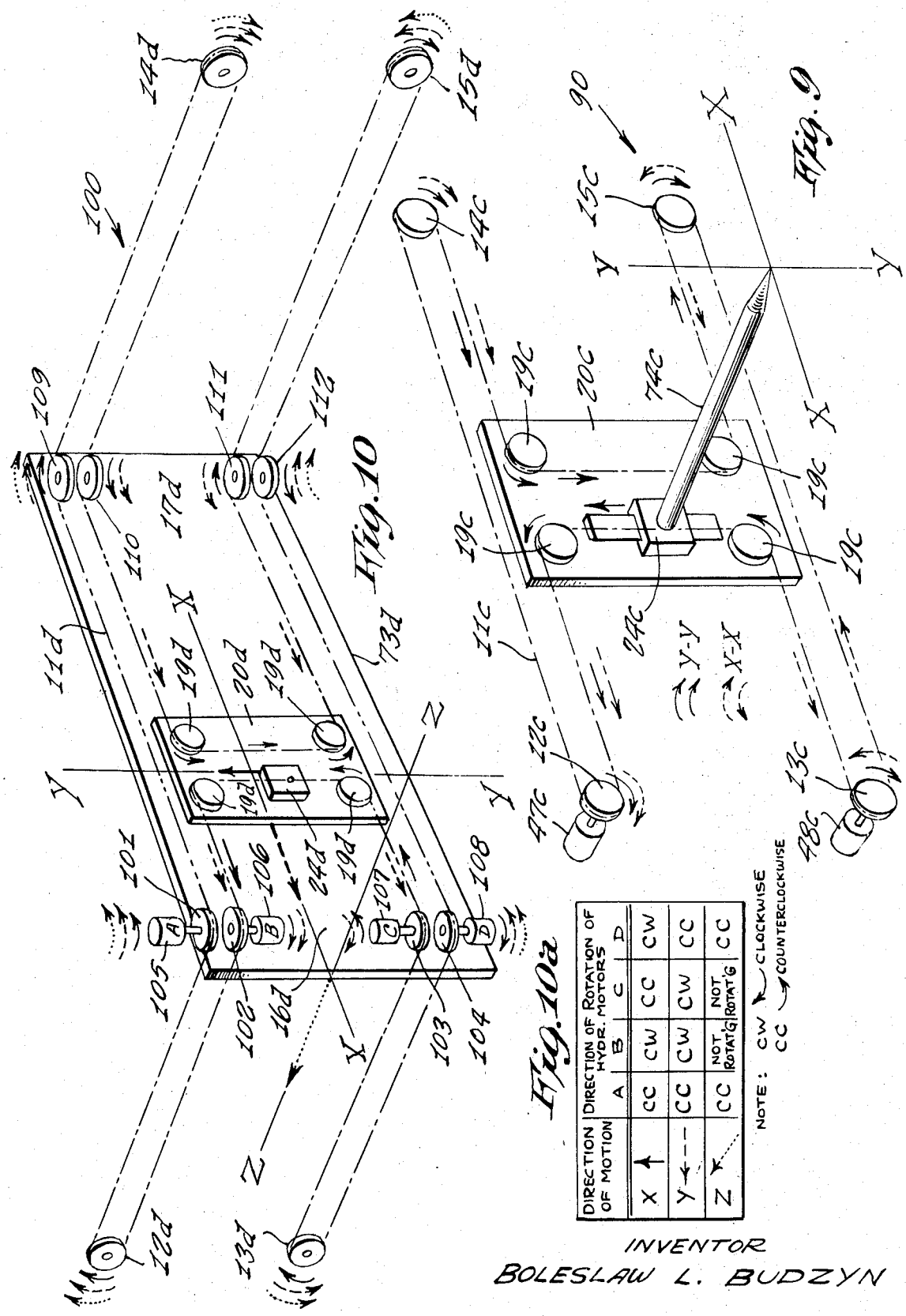

United States Patent Office

3,529,481
Patented Sept. 22, 1970

3,529,481
CHAIN DRIVE SYSTEM FOR MOBILE LOADING
PLATFORM OR FOR TWO- OR THREE-DIMEN-
SIONAL INDEXING
Boleslaw L. Budzyn, 63 Poplar St., Passaic, N.J. 07055
Filed Mar. 27, 1968, Ser. No. 716,480
Int. Cl. F16h 55/00
U.S. Cl. 74—89.21                                    8 Claims

ABSTRACT OF THE DISCLOSURE

A simple chain drive requiring a minimum of mechanism for selective horizontal or vertical travel of a platform for picking up freight and transporting the same from one place to another; or for two- or three-dimensional indexing as it could be applied to numerous mechanical systems.

---

This invention relates generally to mobile loading platforms. More specifically it relates to a chain drive systems for mobile loading platforms.

A principal object is to provide a chain drive system that is very simple in design and which requires a minimum number of parts for loading and moving a mobile loading platform.

Another object is to provide a chain drive system that incorporates a novel mechanical principle whereby a single drive chain is used to selectively move a loading platform either vertically or horizontally.

Yet another object is to provide a chain drive system for accomplishing the above object, and which requires only a conventional clutch therebetween and a power source; or a valving system for controlling the direction of rotation of hydraulic motors between the chain drive and power source.

Yet a further object is to provide a chain drive system that would be particularly adaptable for installation into the body of a truck, airplane, railroad, car, stationary platform, or other area for purpose of transporting freight from one end thereof to the other.

Yet a further object is to provide a chain drive system that could be remotely controlled by a single operator for loading heavy freight.

Yet another further object is to provide a chain drive system which will increase the loading speed of heavy freight and without manual labor thereby cutting labor costs.

Yet another further object is to provide modified chain drive systems which may find application in fixture construction as well as in tooling machinery, where relatively large distances would have to be covered, as for example the drilling of holes in large plates where a high degree of accuracy is not too important; or wherein the system may find application for carrying a heavy load such as by an overhead crane operative in two or three planes of direction; or wherein the system would be adaptable for programmnig hydraulic motors or fluidistic controls, as well as other uses.

Other objects are to provide a chain drive system for mobile loading platforms which is relatively inexpensive to manufacture, rugged in construction, easy to use and efficient in operation.

These and other objects will be readily evident upon a study of the following specification and the accompanying drawing wherein:

FIG. 1 is a perspective view of the chain drive system shown per se,

FIG. 2 is a plan view thereof,

FIG. 3 is a diagram of a hydraulic system and controls for a chain drive as applied to a truck body installation such as is illustrated in FIGS. 4 and 6, FIG. 4 is a perspective view of a truck incorporating the invention, FIG. 5 is a cross sectional view taken on line 5—5 of FIG. 4, FIG. 6 is a perspective view of the control panel of the truck, FIG. 7 is a perspective view of a modified form of the basic present invention as applied to a two-dimensional X—X Y—Y indexer, FIG. 8 is a diagrammatic perspective view of a further modified form wherein motion in Y—Y direction is accomplished directly by chain drive, FIG. 9 is another diagrammatic perspective view of a form generally similar to the basic form but wherein there is a motion on a Y—Y axis in a vertical direction, FIG. 10 is a diagrammatic perspective view of another form having three-dimensional motion in space, and FIG. 10a is a chart indicating the direction of motor rotation to accomplish the motion along the axes illustrated in FIG. 10.

Referring now to the drawing in detail, and more particularly to FIGS. 1 to 6, the reference numeral 10 represents a chain drive system for a mobile loading platform according to the present invention, wherein there is an endless drive chain 11 that travels around four rotatably free sprockets 12, 13, 14 and 15 arranged in a stationary rectangular pattern, as shown in FIGS. 1 and 2. The sprockets 12 and 13 comprise driving sprockets located at one end 16 of the rectangular pattern; and the sprockets 14 and 15 comprise idler sprockets located at the opposite end 17.

The portions of the drive chain 11 extending across the ends 16 and 17 (or more specifically extending between the two driving sprockets and also extending between the two idler sprockets) are threaded through a loading platform assembly 18 where they toothingly engage a series of rotatably free sprockets 19 carried upon the loading platform assembly.

The loading platform assembly comprises a carriage 20 supported upon wheels 21, the carriage providing bearing means for the rotatable sprockets 19; each sprocket having a threaded central opening 22 engaging a vertical threaded screw 23 secured at its upper end to the underside of a vertically movable horizontal deck or platform 24.

It is to be understood that the above described chain drive system 10 is powered by a hydraulic drive system illustrated in FIG. 3, which is designed for practical application. However before describing the hydraulic drive system, for a better understanding thereof, the reader will first be introduced to an elementary diagrammatic drive unit 25 shown in FIG. 1 which while not being practical for actual construction, will more clearly define the fundamental principle of a drive for the system 10. Thus the drive unit 25 shown in FIG. 1 is only a schematic representation of a drive, as the construction of a crossing chain between sprockets, as shown would not be practical.

Referring now to the schematic representation, the drive unit 25 is provided to selectively power the driving sprockets 12 and 13. The drive unit 25 includes a three pole electric motor 26 having output drive shaft 27 upon which the sprocket 12 is secured. The sprocket 13 secured upon a shaft 28 is electively engageable or disengageable, by means of a clutch 29 to a shaft 30 in axial alignment therewith. Another sprocket 31 carried upon shaft 29 is connected by endless sprocket chain 32 to a second sprocket 33 secured upon shaft 27. A sprocket 34 secured upon shaft 30 is connected by endless sprocket chain 35 to a third sprocket 36 secured upon shaft 27. As shown in FIG. 1, it is to be noted that the chain 32 is mounted to transmit a like direction rotational movement between sprockets 31 and 33, while the chain 35 is cross mounted to transmit an opposite direction rotational movement between sprockets 34 and 36.

In operative use, the carriage may be made to travel longitudinally in either direction between opposite ends 16 and 17. Also the platform 24 is vertically movable upwardly or downwardly whenever the carriage is not in travelling motion. This is accomplished by means of the clutch 29 and the direction of motor rotation. Thus, to make the platform to move vertically, the clutch is thrown so as to disengage shaft 28 from shaft 30, and thus cause power from the drive shaft 27 to drive the sprocket 12 and, by means of chain 32 to drive the sprocket 13, causing both sprockets to rotate in the same direction as indicated by the solid arrows $a$ in FIGS. 1 and 2, and making the chain to simply travel around all the freely rotatable sprockets 12, 13, 14, 15 and 19. The rotating sprockets 19 cause the screws 23 to move upwardly or downwardly depending upon the direction of the motor rotation. To make the carriage to travel, the clutch is thrown to engage shafts 28 and 30, (it being understood that in so doing that the sprocket 31 is a uni-directional drive so as to not transmit power thereto.) Now power from drive shaft 27 is transmitted through cross-mounted chain 35 to cause sprocket 13 to rotate in a direction opposite to the rotation of sprocket 12, as indicated by the broken arrows $b$ in FIGS. 1 and 2. Thus the chain can no longer travel around a stationary H-shaped course. The oppositely moving sprockets at one end cause the chain to be withdrawn from between the sprockets of one end, and to be drawn into the space between the sprockets on the opposite end, and making the carriage to travel toward the end from which the chain is being withdrawn. It is to be noted that during this travel, the sprockets 19 on the carriage do not rotate.

Thus there has been provided a novel principle wherein singular drive chain serves to move a loading platform selectively vertically or horizontally.

A practical application of the principle of this invention is shown in FIGS. 3 to 6, wherein it is used for mechanically moving heavy freight between opposite ends of a truck body 40 so to eliminate the laborous chore of doing it by hand.

The truck body includes a floor 41 having two pairs of longitudinally extending channels 42 secured in an inverted position thereupon. Each pair of channels has a loading platform 18 therebetween to form individual track units 43a and 43b each of which is individually operated from a remotely positioned control box 44 conveniently located where an operator may observe the loading procedure of the mechanism.

The two channels 42 of each track unit together enclose the stationarily positioned sprockets 12, 13, 14 and 15 and the outer course of the chain 11 extending therebetween. The inner courses of the chain are not enclosed but are placed alongside and sheltered by overhanging portion 45 of the channels.

As is shown in FIG 5, the carriage wheels 21 ride upon the floor 41, and the platform 24 is vertically movable between the position indicated by the solid lines (wherein the upper surface thereof is lower than the upper surface of the channels) and a position indicated by the phantom lines (wherein the upper surface of the platform is higher than the upper surface of the channel.)

In FIG. 1, for purpose of diagrammatic simplicity, a mechanical clutch and a three-pole motor have been shown for operating the loading platform, however a practical power and power clutch are shown in FIG. 3 which would be better adaptable for vehicular truck. This comprises a hydraulic system 46 including an electric motor driven pump 47 which is used to operate the left track 43a or right track 43b. Each track includes a pair of hydraulic motors 47 and 48 having a motor shaft upon which sprockets 12 and 13 respectively are mounted.

Each track also includes a two-position valve 49 and a three position valve 50. the two-position valve is provided for pre-selecting either the vertical lifting or lowering or horizontal travel operation.

The three-position valve is spring centered in a position to normally bypass oil back to the pump, as illustrated in FIG. 3. By shifting the three-position valve 50 in one way or the other will cause the motors to change directional rotation, and depending upon the position of the two-position valve 49, will either cause the vertical lifting or horizontal travel above described.

The control box is accordingly provided with a toggle switch 51 for operating an electric motor to drive the pump 47. For each track, a separate lever 52 activates valve 49, and another lever 53 activates valve 50. An oil pressure gauge 54 may be included on the control panel.

In operative use, a heavy item of freight 60 is manually moved between track loading platform 61 and the entrance of the truck body. One or several free wheeling rollers 62 may be mounted at the end of each channel to aid in maneuvering the weight into a position so that it bridges the area wherein the loading platform travels, the freight resting upon the channels. The deck 24 is then raised upwardly, lifting the freight off the channels as shown in phantom in FIG. 5. The loading platform carriage is then moved, thus transporting the freight any desired distance into the truck body. The deck is then lowered, bringing the freight to rest upon the channel. The loading platform thus cleared of the freight is free to travel therebelow back to the entrance to handle another item of freight. It will thus be apparent that the laoding plaform may travel with the deck or platform 24 in either a raised or lowered position. In the lowered position, the loading platform may travel below groups of freight so to do work at different areas within the truck body.

In FIGS. 7 through 10 the principle of the present invention is shown applied to various modified mechanisms. In these figures, the parts designated with a like base reference numeral as in the foregoing specification are to be considered the equivalent thereof.

In FIGS. 7, 8 and 9 movement of a pointer along an X—X axis is accomplished when the drive chain travels in the direction indicated by the broken arrows. Movement of the pointer along a Y—Y axis is accomplished when the drive chain travels in a direction indicated by the solid arrows. A chart in FIG. 10a identifies the more complex travel of parts illustrated in FIG. 10.

In FIG. 7, a mechanism 70 having the same principle is generally similar structurally to the chain drive system 10, except that it includes only two sprockets 19a upon a carriage 20a slidable along a panel 73; and the mechanism includes a positioning pointer 74 secured to platform 24a the pointer accordingly moving along an X—X axis when the carriage is moved respective to the panel, and the pointer traveling along a Y—Y axis when the platform is moved respective to the carriage. In this mechanism, the motion along the Y—Y axis will be much slower than the motion along the X—X axis.

In FIG. 8, a mechanism 80 is shown wherein motion speed along both axes directions is the same. It includes the same principal elements of mechanism 70 except that each sprocket 19a is substituted by a pair of sprockets 19b each of which is independently rotatable in either direction about a common shaft; and the pointer 74b is connected directly to a portion of the drive chain 116 which runs along a Y—Y plan perpendicular to the remaining plane X—X of the drive chain. Thus pointer 74b can travel with equal speed along either plane. It is to be understood that in this form of the invention, the conventional sprocket chain as shown in FIGS. 1 and 2 cannot be used, and would necessarily be replaced by a special chain 116 that can flex in two directions or by a cable. This mechanism would be adaptable for spraying patterns or the like. It is to be noted that sprockets 196 are pivotable about axes that are perpendicular to the axes of the drive and idler sprockets.

In FIG. 9, the same basic principle of the invention is shown in a mechanism 90 but wherein a positioner pointer 74c would have motion along a Y—Y plane that is picked up directly from a sprocket chain 11c of conventional type, thus eliminating the double flexing of chain 116 shown in FIG. 8. This mechanism would be particularly adaptable for movement of heavy loads.

In FIG. 10, a mechanism 100 incorporating the basic principle above described provides three-dimensional movement for a member 24d carried upon the mechanism. In the present form, the carriage 20d travels in an X—X plane along a panel 73d the same as the above described carriage 20a movable along panel 73 in FIG. 7. The member 24d is the equivalent of member 24c in FIG. 9 and accordingly travels in a Y—Y plane respective to the carriage. These motions are accomplished by the same drive chain pattern as described in the basic form of the invention. However in the present form, the drive chain is extended at each end 16d and 17d and the extended chain is directed into a Z—Z plane. Thus the sprockets 12d, 13d, 14d and 15d are mounted on a plane perpendicular to the plane along which the chain carries the carriage 20d.

Four drive sprockets 101, 102, 103 and 104 are provided around which the chain travels to change from an X—X, Y—Y plane to a plane Z—Z perpendicular thereto. A hydraulic motor 105, 106, 107 and 108 powers each of the drive sprockets respectively. Four idler sprockets 109, 110, 111 and 112 likewise guide the chain at one end of the X—X, Y—Y plane to allow it to change direction into the Z—Z plane. Thus the panel 73d is movable along the plane Z—Z, so to provide three dimensional travel in space to a member 24d.

While various changes may be made in the detail construction, it is understood that such changes will be within the spirit and scope of the present invention as is defined by the appended claims.

I claim:
1. A chain driving system comprising, in combination, a support; a pair of spaced drive sprockets and a primary pair of spaced idler sprockets mounted at spaced points on said support; a single endless chain engaging each of said sprockets; a unit mounted on said support for horizontal movement therealong by said chain between said drive sprockets and said primary idler sprockets; at least two secondary idler sprockets mounted at spaced points on said unit: one of said secondary sprockets engaging the portion of said chain between said drive sprockets and the other of said secondary sprockets engaging the portion of said chain between said primary idler sprockets; a platform mounted on said unit for movement in a vertical plane at right angles to the plane of movement of said unit and including means engageable by said secondary sprockets to effect such angular movement upon their rotation by said chain; and power means for driving said drive sprockets to effect movement of said chain.

2. The combination as set forth in claim 1 wherein said secondary sprockets are secured rotatably free to said unit, each said sprocket having a central threaded openings engaging a screw secured rigidly to said platform.

3. The combination recited in claim 1 wherein said power means is operative to separately drive said drive sprockets in different directions to effect said movement of said unit along said support.

4. The combination recited in claim 3 wherein said power means is reversible to effect return movement of said unit.

5. The combination recited in claim 1 wherein said power means is operative to drive said drive sprockets in the same directions to effect said angular movement of said platform.

6. The combination recited in claim 5 where said power means is reversible to effect reverse angular movement of said platform.

7. The combination recited in claim 1 wherein said support comprises a truck body floor.

8. The combination recited in claim 7; a pair of longitudinal channels mounted in inverted position on said floor to enclose said drive sprockets and said primary pair of idler sprockets and said drive chain therebetween; said platform of said unit being vertically movable between a position lower than the upper surface of said channels, and a position higher than the upper surface of said channels to form a loading platform for lowering a load onto said channels and for raising a load thereabove.

References Cited
UNITED STATES PATENTS

| | | | |
|---|---|---|---|
| 905,887 | 12/1908 | La Belle | 74—89.15 |
| 2,280,567 | 4/1942 | Austin | 214—16.18 |
| 2,628,539 | 2/1953 | De Neergaard | 214—11 |
| 2,652,938 | 9/1953 | Murphy | 214—16.18 |
| 2,707,666 | 5/1953 | Becker | 214—16.18 |
| 2,820,187 | 1/1958 | Parsons et al. | 214—11 |
| 2,927,258 | 3/1960 | Lippel | 214—11 |
| 3,074,563 | 1/1963 | Montgomery | 74—89.21 |
| 3,273,408 | 9/1966 | Nagel et al. | 74—89.22 |
| 3,338,104 | 8/1967 | Drain | 74—216.5 |
| 2,675,291 | 4/1954 | Webster. | |
| 2,746,151 | 5/1956 | Kennedy. | |
| 3,241,243 | 3/1966 | Speer. | |

OTHER REFERENCES

Ross Whistler: Cartesian Coordinate Planar Drive System; RCA Technical Notes No. 339, November 1959; pp. 1–2.

WESLEY S. RATLIFF, JR., Primary Examiner

U.S. Cl. X.R.
33—1; 214—516